[11] 3,992,086
[45] Nov. 16, 1976

[54] COMPACT RETROFOCUS-TYPE WIDE-ANGLE PHOTOGRAPHIC LENS SYSTEM

[75] Inventor: Nobuo Yamashita, Tama, Japan

[73] Assignee: Olympus Optical Co., Ltd., Tokyo, Japan

[22] Filed: July 12, 1974

[21] Appl. No.: 488,205

[30] Foreign Application Priority Data
July 14, 1973 Japan .................. 48-78910

[52] U.S. Cl. ............................................. 350/214
[51] Int. Cl.² ........................................... G02B 9/64
[58] Field of Search ............................... 350/214

[56] References Cited
UNITED STATES PATENTS

| 3,635,546 | 1/1972 | Mori | 350/214 |
|---|---|---|---|
| 3,645,605 | 2/1972 | Nakagawa | 350/214 |
| 3,884,556 | 5/1975 | Nakagawa | 350/215 |

*Primary Examiner*—John K. Corbin
*Assistant Examiner*—Conrad Clark
*Attorney, Agent, or Firm*—Cushman, Darby & Cushman

[57] ABSTRACT

A compact retrofocus-type wide-angle photographic lens system with a long back focal length comprising seven lens components and satisfying the following conditions:
1. $0.5f < |f_{123}| < 0.8f, f_{123} < 0$
2. $0.4f < d_7 + d_9 < 0.8f$
3. $d_9/d_7 < 0.35$
4. $d_8 < 0.2f$
5. $0.6 < r_5/r_3 < 1.5$ For said wide-angle photographic lens system, aberrations are favorably corrected and, moreover, astigmatism in close-up photographing is also corrected quite favorably.

2 Claims, 11 Drawing Figures

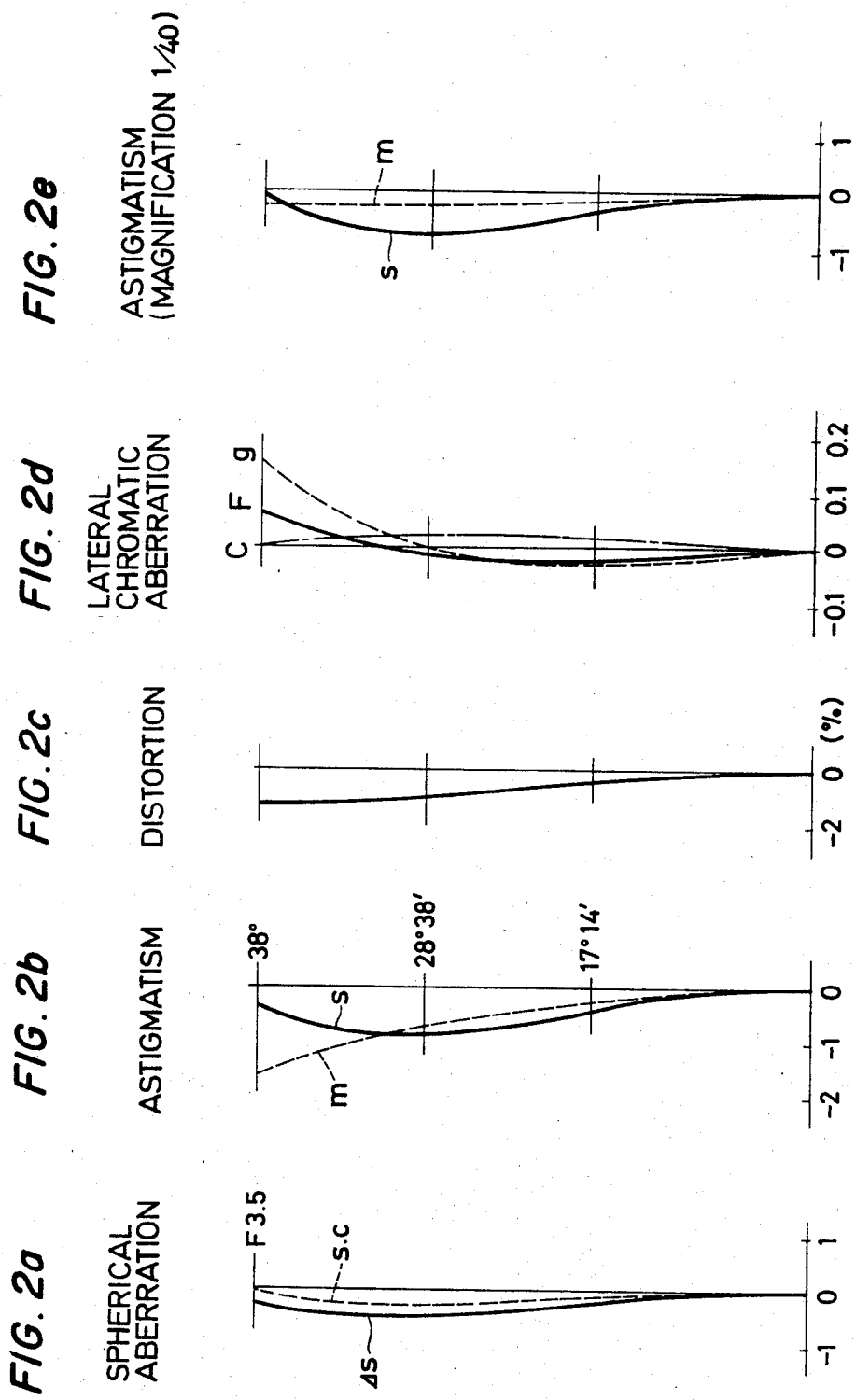

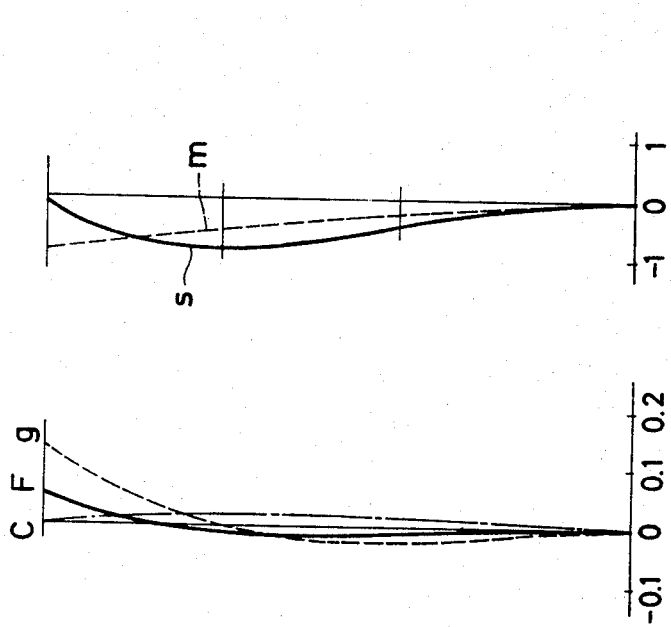
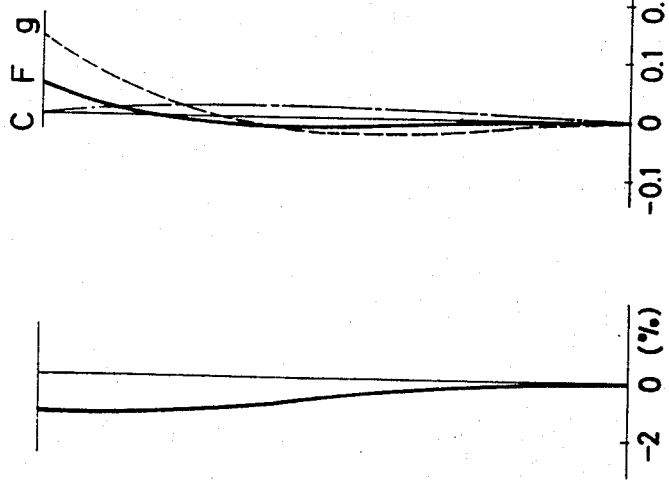
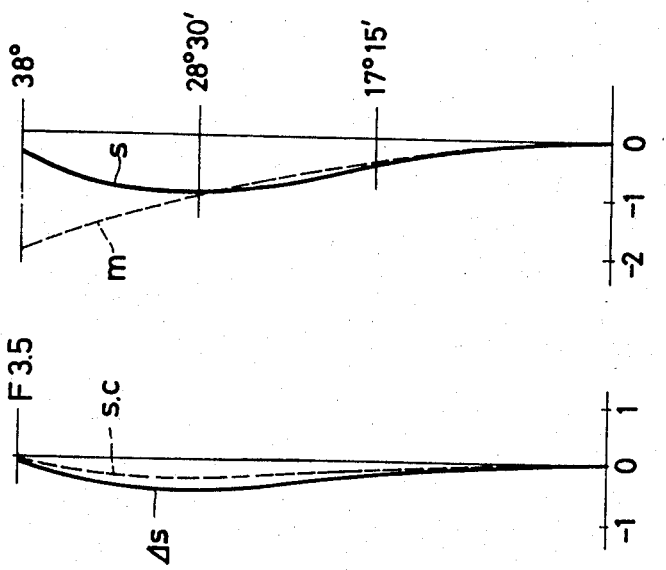

COMPACT RETROFOCUS-TYPE WIDE-ANGLE PHOTOGRAPHIC LENS SYSTEM

BACKGROUND OF THE INVENTION a. Field of the Invention

The present invention relates to a photographic lens system and, more particularly, to a compact retrofocus-type wide-angle photographic lens system for which the overall length of the lens system is small, diameter of the front lens is small and the back focal length is approximately 1.34 times the focal length of the lens system as a whole.

b. Description of the Prior Art

For compact wide-angle photographic lens systems having a front lens of small diameter, it is generally difficult to favourably correct astigmatism and curvature of field over the whole field angle and, moreover, astigmatism especially aggravates in case of close-up photographing.

SUMMARY OF THE INVENTION

It is, therefore, an object of the present invention to provide a compact retrofocus-type wide-angle photographic lens system for which aberrations are corrected favourably and, especially, astigmatism is very favourably corrected even in close-up photographing.

The retrofocus-type wide-angle photographic lens system according to the present invention which attains the above object comprises seven lens components, i.e., a first lens component $L_1$ being a positive meniscus lens with its convex surface positioned on the object side, a second lens component $L_2$ and third lens component $L_3$ respectively being negative meniscus lenses with their convex surfaces positioned on the object side, a fourth lens component $L_4$ being a positive lens, a fifth lens component $L_5$ being a negative lens, and a sixth lens component $L_6$ and seventh lens component $L_7$ respectively being positive lenses with their concave surfaces positioned on the object side; said retrofocus-type wide-angle photographic lens system satisfying the following conditions:

1. $0.5f < |f_{123}| < 0.8f, f_{123} < 0$
2. $0.4f < d_7 + d_9 < 0.8f$
3. $d_9/d_7 < 0.35$
4. $d_8 < 0.2f$
5. $0.6 < r_5/r_3 < 1.5$ wherein reference symbol $f$ represents the focal length of the lens system as a whole, reference symbol $f_{123}$ represents the total focal length of the first lens component $L_1$, second lens component $L_2$ and third lens component $L_3$, reference symbols $d_7$ and $d_9$ respectively represent thicknesses of the fourth lens component $L_4$ and fifth lens component $L_5$, reference symbol $d_8$ represents the airspace between the fourth lens component $L_4$ and fifth lens component $L_5$, and reference symbols $r_3$ and $r_5$ respectively represent radii of curvature of surfaces on the object side of the second lens component $L_2$ and third lens component $L_3$.

In the lens system according to the present invention as mentioned above, the diameter of the front lens can be made small when the total focal length $|f_{123}|$ of the first lens component $L_1$, second lens component $L_2$ and third lens component $L_3$ is small. However, if $|f_{123}|$ is smaller than the lower limit in the condition 1, negative distortion and astigmatism become large, and it is not desirable because it becomes difficult to favourably correct them. If $|f_{123}|$ becomes larger than the upper limit of the condition 1, it may be advantageous for correction of aberrations. However, the back focal length becomes short and the object of the present invention cannot be attained.

If $d_7 + d_9$ becomes smaller than the lower limit of the condition 2, the back focal length becomes short. If $d_7 + d_9$ exceeds the upper limit of the condition 2, the overall length of the lens system becomes long and the object of the present invention cannot be attained.

To maintain the front lens diameter small and to maintain the back focal length long, it is desirable to make $d_9 / d_7$, i.e., the ratio of the thickness $d_7$ of the fourth lens component $L_4$ and thickness $d_9$ of the fifth lens component $L_5$ larger as the field angle of the lens system becomes larger. When, however, $d_9 / d_7$ becomes larger, negative distortion and lateral chromatic aberration also become larger. For a wide-angle lens system with the field angle about 76°, it is not desirable to make $d_9 / d_7$ large because the above-mentioned aberrations become large. The condition 3 is established for the above-mentioned reason.

When the airspace $d_8$ between the fourth lens component $L_4$ and fifth lens component $L_5$ becomes larger and distances from the stop of respective lens components behind the stop become larger, negative distortion and lateral chromatic aberration become larger. Especially when $d_8$ exceeds the range defined by the condition 4, it is difficult to favourably correct these aberrations.

The condition 5 is established for the purpose of making angles of incidence on respective lens surfaces become smaller little by little and thereby preventing aggravation of negative distortion and astigmatism. If $r_5 / r_3$ in the condition 5 becomes smaller than the lower limit, reduction of the angle of incidence on the surface $r_3$ on the object side of the second lens component $L_2$ becomes considerably larger than reduction of the angle of incidence on the surface $r_5$ on the object side of the third lens component $L_3$, and the above-mentioned aberrations become large. If $r_5 / r_3$ exceeds the upper limit, reduction of the angle of incidence on the surface $r_5$ on the object side of the third lens component $L_3$ becomes larger than reduction of the angle of incidence on the surface $r_3$ on the object side of the second lens component $L_2$. Consequently, the distance of the entrance pupil of the lens system from the front surface of the lens system becomes large, the front lens diameter becomes large and, therefore, the object of the present invention to provide a compact lens system cannot be attained.

Besides, when the ratio of the radius of curvature $r_2$ of the surface on the image side of the first lens component $L_1$ to the radius of curvature $r_3$ of the surface on the object side of the second lens component $L_2$, i.e. $r_2 / r_3$, is made as defined in the condition 6 given below, aberrations can be corrected more favourably.

6. $1.4 < r_2 / r_3 < 2.0$

If $r_2 / r_3$ becomes smaller than the lower limit of the condition 6, negative distortion becomes large and it becomes difficult to favourably correct it. If $r_2 / r_3$ exceeds the upper limit, the meridional and sagittal astigmatic difference for portions of larger field angles becomes large.

BRIEF EXPLANATION OF THE DRAWINGS

FIGS. 2a, 2b, 2c, 2d and 2e respectively show graphs of aberration curves of the embodiment 1 of the lens system according to the present invention; and FIGS. 3a, 3b, 3c, 3d and 3e respectively show graphs of aberration curves of the embodiment 2 of the lens system according to the present invention.

DETAILED DESCRIPTION OF THE PREFERRED EMBODIMENTS

Figure 1:
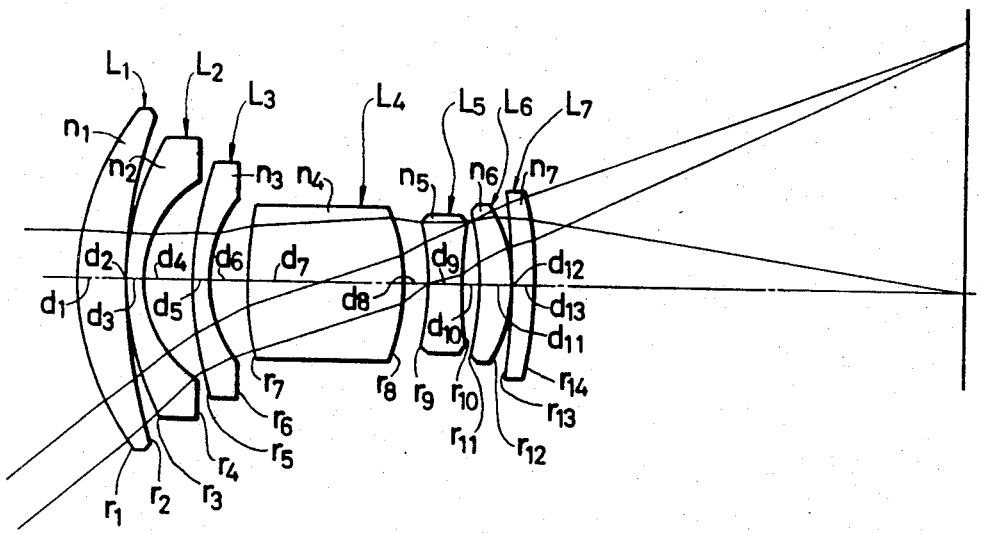
FIG. 1 shows a sectional view of the lens system according to the present invention.

Preferred embodiments of the lens system according to the present invention are shown below.

Embodiment 1

| | | | |
|---|---|---|---|
| $r_1 = 87.306$ | | | |
| | $d_1 = 14.28$ | $n_1 = 1.72$ | $\nu_1 = 42.08$ |
| $r_2 = 162.911$ | | | |
| | $d_2 = 0.357$ | | |
| $r_3 = 97.551$ | | | |
| | $d_3 = 5.356$ | $n_2 = 1.58913$ | $\nu_2 = 61.11$ |
| $r_4 = 36.310$ | | | |
| | $d_4 = 14.60$ | | |
| $r_5 = 114.111$ | | | |
| | $d_5 = 5.356$ | $n_3 = 1.58913$ | $\nu_3 = 61.11$ |
| $r_6 = 39.524$ | | | |
| | $d_6 = 11.283$ | | |
| $r_7 = 78.687$ | | | |
| | $d_7 = 48.775$ | $n_4 = 1.6779$ | $\nu_4 = 53.36$ |
| $r_8 = -73.327$ | | | |
| | $d_8 = 7.141$ | | |
| $r_9 = -76.694$ | | | |
| | $d_9 = 10.926$ | $n_5 = 1.7618$ | $\nu_5 = 27.11$ |
| $r_{10} = 230.504$ | | | |
| | $d_{10} = 4.606$ | | |
| $r_{11} = -143.783$ | | | |
| | $d_{11} = 8.927$ | $n_6 = 1.6968$ | $\nu_6 = 55.62$ |
| $r_{12} = -50.050$ | | | |
| | $d_{12} = 0.536$ | | |
| $r_{13} = -1724.112$ | | | |
| | $d_{13} = 7.855$ | $n_7 = 1.56873$ | $\nu_7 = 63.16$ |
| $r_{14} = -113.904$ | | | |

$f = 100, f_{123} = -70.29, B.f. = 134.05$

Embodiment 2

| | | | |
|---|---|---|---|
| $r_1 = 96.475$ | | | |
| | $d_1 = 14.29$ | $n_1 = 1.7352$ | $\nu_1 = 41.08$ |
| $r_2 = 160.012$ | | | |
| | $d_2 = 0.36$ | | |
| $r_3 = 85.458$ | | | |
| | $d_3 = 5.36$ | $n_2 = 1.50378$ | $\nu_2 = 66.81$ |
| $r_4 = 35.556$ | | | |
| | $d_4 = 14.61$ | | |
| $r_5 = 109.514$ | | | |
| | $d_5 = 5.36$ | $n_3 = 1.64$ | $\nu_3 = 60.25$ |
| $r_6 = 37.124$ | | | |
| | $d_6 = 11.29$ | | |
| $r_7 = 76.508$ | | | |
| | $d_7 = 44.46$ | $n_4 = 1.6779$ | $\nu_4 = 53.36$ |
| $r_8 = -72.651$ | | | |
| | $d_8 = 7.14$ | | |
| $r_9 = -74.912$ | | | |
| | $d_9 = 10.93$ | $n_5 = 1.72825$ | $\nu_5 = 28.46$ |
| $r_{10} = 193.104$ | | | |
| | $d_{10} = 4.61$ | | |
| $r_{11} = -170.430$ | | | |
| | $d_{11} = 8.93$ | $n_6 = 1.64$ | $\nu_6 = 60.25$ |
| $r_{12} = -46.484$ | | | |
| | $d_{12} = 0.54$ | | |
| $r_{13} = -943.009$ | | | |
| | $d_{13} = 7.86$ | $n_7 = 1.56873$ | $\nu_7 = 63.16$ |
| $r_{14} = -117.467$ | | | |

$f = 100, f_{123} = -67.28, B.f. = 133.98$

In the above embodiments, reference symbols $r_1$ through $r_{14}$ respectively represent radii of curvature of respective lens surfaces, reference symbols $d_1$ through $d_{13}$ respectively represent thicknesses of respective lenses and airspaces between respective lens, reference symbols $n_1$ through $n_7$ respectively represent refractive indexes of respective lenses, $\nu_1$ through $\nu_7$ respectively represent Abbe's numbers of respective lenses, reference symbol $f$ represents the focal length of the lens system as a whole, reference symbol $f_{123}$ represents the total focal length of the first lens component $L_1$, second lens component $L_2$ and third lens component $L_3$, and reference symbol B.f. represents the back focal length. Curves illustrating conditions of aberrations of the above-mentioned embodiments are shown in FIGS. 2a, 2b, 2c, 2d, 2e, 3a, 3b, 3c, 3d and 3e. As shown in the above graphs of aberration curves, aberrations are quite favourably corrected for both of the embodiments 1 and 2. For example, as it is evident from FIGS. 2e and 3e, astigmatism in close-up photographing (magnification 1/40) is also corrected extremely favourably.

I claim:

1. A compact retrofocus-type wide-angle photographic lens system comprising seven lens components, a first lens component being a positive meniscus lens with its convex surface positioned on the object side, a second lens component being a negative meniscus lens with its convex surface positioned on the object side, a third lens component being a negative meniscus lens with its convex surface positioned on the object side, a fourth lens component being a positive lens, a fifth lens component being a negative lens, a sixth lens component being a positive lens with its concave surface positioned on the object side, and a seventh lens component being a positive lens with its concave surface positioned on the object side, and said compact retrofocus-type wide-angle photographic lens system having the following numerical values:

| | | | |
|---|---|---|---|
| $r_1 = 87.306$ | | | |
| | $d_1 = 14.28$ | $n_1 = 1.72$ | $\nu_1 = 42.08$ |
| $r_2 = 162.911$ | | | |
| | $d_2 = 0.357$ | | |
| $r_3 = 97.551$ | | | |
| | $d_3 = 5.356$ | $n_2 = 1.58913$ | $\nu_2 = 61.11$ |
| $r_4 = 36.310$ | | | |
| | $d_4 = 14.60$ | | |
| $r_5 = 114.111$ | | | |
| | $d_5 = 5.356$ | $n_3 = 1.58913$ | $\nu_3 = 61.11$ |
| $r_6 = 39.524$ | | | |
| | $d_6 = 11.283$ | | |
| $r_7 = 78.687$ | | | |
| | $d_7 = 48.775$ | $n_4 = 1.6779$ | $\nu_4 = 53.36$ |
| $r_8 = -73.327$ | | | |
| | $d_8 = 7.141$ | | |
| $r_9 = -76.694$ | | | |
| | $d_9 = 10.926$ | $n_5 = 1.7618$ | $\nu_5 = 27.11$ |
| $r_{10} = 230.504$ | | | |
| | $d_{10} = 4.606$ | | |
| $r_{11} = -143.783$ | | | |
| | $d_{11} = 8.927$ | $n_6 = 1.6968$ | $\nu_6 = 55.62$ |
| $r_{12} = -50.050$ | | | |
| | $d_{12} = 0.536$ | | |
| $r_{13} = -1724.112$ | | | |
| | $d_{13} = 7.855$ | $n_7 = 1.56873$ | $\nu_7 = 63.16$ |
| $r_{14} = -113.904$ | | | |

$f = 100, f_{123} = -70.29, B.f. = 134.05$ wherein reference symbols $r_1$ through $r_{14}$ respectively represent radii of curvature of respective lens surfaces, reference symbols $d_1$ through $d_{13}$ respectively represent thicknesses of respective lenses and airspaces between respective lenses, reference symbols $n_1$ through $n_7$ respectively represent refractive indexes of respective lenses, $\nu_1$ through $\nu_7$ respectively represent Abbe's numbers of respective lenses, reference symbol $f$ represents the focal length of the lens system as a whole, reference symbol $f_{123}$ represents the total focal length of the first, second and third lens components, and reference symbol B.f. represents the back focal length.

2. A compact retrofocus-type wide-angle photographic lens system comprising seven lens components, a first lens component being a positive meniscus lens with its convex surface positioned on the object side, a second lens component being a negative meniscus lens with its convex surface positioned on the object side, a third lens component being a negative meniscus lens with its convex surface positioned on the object side, a fourth lens component being a positive lens, a fifth lens component being a negative lens, a sixth lens component being a positive lens with its concave surface positioned on the object side, and a seventh lens component being a positive lens with its concave surface positioned on the object side, and said compact retrofocus-type wide-angle photographic lens system having the following numerical values:

| | | | |
|---|---|---|---|
| $r_1 = 96.475$ | | | |
| | $d_1 = 14.29$ | $n_1 = 1.7352$ | $\nu_1 = 41.08$ |
| $r_2 = 160.012$ | | | |
| | $d_2 = 0.36$ | | |
| $r_3 = 85.458$ | | | |
| | $d_3 = 5.36$ | $n_2 = 1.50378$ | $\nu_2 = 66.81$ |
| $r_4 = 35.556$ | | | |
| | $d_4 = 14.61$ | | |
| $r_5 = 109.514$ | | | |
| | $d_5 = 5.36$ | $n_3 = 1.64$ | $\nu_3 = 60.25$ |
| $r_6 = 37.124$ | | | |
| | $d_6 = 11.29$ | | |
| $r_7 = 76.508$ | | | |

-continued

| | | | |
|---|---|---|---|
| $r_8 = -72.651$ | $d_7 = 44.46$ | $n_4 = 1.6779$ | $\nu_4 = 53.36$ |
| | $d_8 = 7.14$ | | |
| $r_9 = -74.912$ | | | |
| | $d_9 = 10.93$ | $n_5 = 1.72825$ | $\nu_5 = 28.46$ |
| $r_{10} = 193.104$ | | | |
| | $d_{10} = 4.61$ | | |
| $r_{11} = -170.430$ | | | |
| | $d_{11} = 8.93$ | $n_6 = 1.64$ | $\nu_6 = 60.25$ |
| $r_{12} = -46.484$ | | | |
| | $d_{12} = 0.54$ | | |
| $r_{13} = -943.009$ | | | |
| | $d_{13} = 7.86$ | $n_7 = 1.56873$ | $\nu_7 = 63.16$ |
| $r_{14} = -117.467$ | | | |

$f = 100$, $f_{123} = -67.28$, B.f. $= 133.98$ wherein reference symbols $r_1$ through $r_{14}$ respectively represent radii of curvature of respective lens surfaces, reference symbols $d_1$ through $d_{13}$ respectively represent thicknesses of respective lenses and airspaces between respective lenses, reference symbol $n_1$ through $n_7$ respectively represent refractive indexes of respective lenses, $\nu_1$ through $\nu_7$ respectively represent Abbe's numbers of respective lenses, reference symbol $f$ represents the focal length of the lens system as a whole, reference symbol $f_{123}$ represents the total focal length of the first, second and third lens components, and reference symbol B.f. represents the back focal length.

* * * * *